US007310192B2

(12) United States Patent
Nagai et al.

(10) Patent No.: US 7,310,192 B2
(45) Date of Patent: Dec. 18, 2007

(54) ZOOM LENS

(75) Inventors: Youhei Nagai, Tokyo (JP); Yasuhiko Abe, Toda (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 11/283,549

(22) Filed: Nov. 18, 2005

(65) Prior Publication Data

US 2006/0103946 A1 May 18, 2006

(30) Foreign Application Priority Data

Nov. 18, 2004 (JP) ............................ 2004-334704

(51) Int. Cl.
*G02B 15/14* (2006.01)

(52) U.S. Cl. ...................................... 359/691; 359/683

(58) Field of Classification Search ................ 359/680, 359/682, 683, 691
See application file for complete search history.

(56) References Cited

U.S. PATENT DOCUMENTS

| | | | | |
|---|---|---|---|---|
| 5,329,402 | A * | 7/1994 | Sato | 359/691 |
| 6,275,342 | B1 * | 8/2001 | Sakamoto et al. | 359/691 |
| 2006/0238890 | A1 * | 10/2006 | Nanba et al. | 359/689 |

FOREIGN PATENT DOCUMENTS

| | | |
|---|---|---|
| JP | 8-254653 A | 10/1996 |
| JP | 9-166749 A | 6/1997 |
| JP | 9-211325 A | 8/1997 |
| JP | 10-253882 A | 9/1998 |

OTHER PUBLICATIONS

Patent Abstracts of Japan for JP9-166749 published Jun. 24, 1997.
Patent Abstracts of Japan for JP9-211325 published Aug. 15, 1997.
Patent Abstracts of Japan for JP8-254653 published Oct. 1, 1996.
Patent Abstracts of Japan for JP10-253882 published Sep. 25, 1998.

* cited by examiner

*Primary Examiner*—Ricky Mack
*Assistant Examiner*—William C Choi
(74) *Attorney, Agent, or Firm*—Darby & Darby P. C

(57) ABSTRACT

A zoom lens is equipped with: a first lens group having an overall negative refractive power and a second lens group having an overall positive refractive power in sequence from the object side to the image plane side. Zoom magnification is changed from a wide-angle end to a telephoto end by moving the first lens group to the image plane side and then reversing the motion to the object side while the second lens group is moved to the object side. The condition (1) 0.90<=(DG1+DG2)/fw<=2.30 and the condition (2) 0.5<=|fG1|/fG2<=1.6 are met, where DG1 is the thickness of the first lens group; DG2 is the thickness of the second lens group; fw is the focal length of the lens system at the wide-angle and; fG1 is the focal length of the first lens group; and fG2 is the focal length of the second lens group. With above structure, the power arrangements for the first and second lens groups are set appropriately providing a zoom magnification ratio of approximately 3× beside making the design of the zoon lens compact and thin.

16 Claims, 8 Drawing Sheets

WIDE-ANGLE END

MIDDLE POSITION

TELEPHOTO END

WIDE-ANGLE END

MIDDLE POSITION

TELEPHOTO END

ZOOM LENS

INCORPORATION BY REFERENCE

The present application claims priority under 35 U.S.C. §119 to Japanese Patent Application No. 2004-334704 filed on Nov. 18, 2004. The content of the application is incorporated herein by reference in its entirety.

BACKGROUND OF THE INVENTION

The present invention relates to a zoom lens used in digital still cameras, video cameras, and the like equipped with a solid-state imaging element such as a CCD. More specifically, the present invention relates to a compact zoom lens suited for cameras and the like that have a zoom magnification of approximately 3× and that is connected to or installed in a portable information terminal or the like.

With the widespread use of digital cameras in recent years, there has been a strong demand for zoom lenses that are used in these digital cameras that provide high performance, low cost, and a compact, thin design. More specifically, in zoom lenses for cameras installed in portable telephones and the like, there is a strong demand for a zoom lens that is thin when it is retracted.

An example of a compact, thin zoom lens is a two-group zoom lens that is equipped with a first lens group and a second lens group and that allows the zoom magnification to be changed by varying the distance between these lens groups. Known examples of conventional two-group zoom lenses include: a zoom lens formed from five-six lenses with a first lens group having positive refractive power and a second lens group having negative refractive power (e.g., see Japanese Laid-Open Patent Publication Number Hei 9-166749 and Japanese Laid-Open Patent Publication Number Hei 9-211325); and a zoom lens formed from seven lenses equipped with a first lens group having negative refractive power and a second lens group having positive refractive power (e.g., see Japanese Laid-Open Patent Publication Number Hei 8-254653 and Japanese Laid-Open Patent Publication Number Hei 10-253882).

In solid-state imaging elements, microlenses are disposed on an image plane in order to make efficient use of light. Thus, if the angle of a light ray entering the solid-state imaging element, i.e., the exit angle, is too large, “shading” takes place. As a result, in lens systems used for solid-state imaging elements, it is preferable to use a telecentric optical system in which the exit pupil is positioned with a sufficient distance from the image plane, and the exit angle is small.

While the conventional two-group zoom lens with a first lens group having positive refractive power and a second lens group having negative refractive power is compact and thin and is suitable for use in silver halide film cameras, the exit angle of the outermost optical rays at the wide-angle end becomes too large, making the zoom lens difficult to use with solid-state imaging elements. Also, in the conventional two-group zoom lens with the first lens group having negative refractive power and the second lens group having positive refractive power, the exit angle can be kept small but the need to use seven lenses makes it difficult to achieve an adequately compact and thin design.

OBJECT AND SUMMARY OF THE INVENTION

The object of the present invention is to overcome the problems described above and to provide a zoom lens suitable for use in digital cameras and digital video cameras wherein a zoom magnification ratio is approximately 3×, superior optical properties are provided with a compact design, and the structure is adequately thin when retracted.

A zoom lens according to the present invention includes, going from an object side to an image plane side: a first lens group having an overall negative refractive power; and a second lens group having an overall positive refractive power; wherein zoom magnification is changed from a wide-angle end to a telephoto end by moving the lens group toward the image plane side and then reversing to the object side, while moving the second lens group to the object side.

The zoom lens meets conditions (1), (2):

$$0.90<=(DG1+DG2)/fw<=2.30 \quad (1)$$

$$0.5<=|fG1|/fG2<=1.6 \quad (2)$$

where DG1 is the thickness of the first lens group along the optical axis; DG2 is the thickness of the second lens group along the optical axis; fw is the focal length of the lens system at the wide-angle end from the first lens group to the image plane; fG1 is the focal length of the first lens group; and fG2 is the focal length of the second lens group.

In this structure, since the first lens group has negative refractive power and the second lens group has positive refractive power, the exit angle of the outermost light rays at the wide-angle end can be kept small, providing a zoom lens suited for solid-state imaging elements. Also, since the conditions (1) and (2) are met, the powers of the first lens group and the second lens group are set up appropriately, and a compact and thin design is made possible while providing a zoom magnification ratio of approximately 3×.

According to another aspect of the present invention, in the structure described above, the first lens group includes, going from the object side to the image plane side, a meniscus-shaped first lens having negative refractive power and a convex surface facing toward the object side and a meniscus-shaped second lens having positive refractive power and a convex surface facing toward the object side; and conditions (3), (4) are met:

$$0.10<=D2/fw<=0.35 \quad (3)$$

$$1.5<=|fG1|/fw<=2.5 \quad (4)$$

where D2 is the air distance between the first lens and the second lens.

With this structure, since the thickness of the first lens group can be defined by condition (3), an adequately thin design can be achieved while various types of aberration, especially coma aberration, can be effectively corrected.

Also, since the power of the first lens group is defined by the condition (4), a desired zoom magnification ratio can be provided and various types of aberration can be effectively corrected.

According to another aspect of the present invention, in the structure described above, the second lens group includes, going from the object side to the image plane side, a third lens with positive refractive power, a fourth lens with negative refractive power, and a fifth lens with positive refractive power. The condition (5) is met:

$$1.2<=fG2/fw<=3.5 \quad (5)$$

With this structure, since the power of the second lens group is defined by the condition (5), a desired zoom magnification can be provided and various types of aberration can be effectively corrected.

According to another aspect of the present invention, in the structure described above, an aperture stop is disposed to move in tandem with the second lens group; and the aperture stop is disposed at a position furthest toward the object side of the second lens group.

With this structure, since the aperture stop is disposed at the front surface of the second lens group, the exit pupil is prevented from approaching the image plane at the wide-angle end. Also, since the aperture stop moves in tandem with the second lens group, the optical path difference of the second lens group from the wide-angle end to the telephoto end can be reduced, making it possible for the second lens group to be compact and thin in a retracted state.

According to another aspect of the present invention, in the structure described above, the first lens group and the second lens group include lenses with aspherical surfaces; and the aspherical surfaces are formed so that refractive power is lower toward a perimeter of the lens.

With this structure, since a lens in each of the lens groups has an aspherical surface shape, the number of lenses can be kept low while various types of aberration can be effectively corrected.

According to another aspect of the present invention, in the structure described above, the first lens of the first lens group includes an aspherical surface.

With this structure, since the first lens at the position furthest toward the object side is formed with an aspherical surface, transverse aberrations such as astigmatic aberration and distortion can be effectively corrected.

According to another aspect of the present invention, in the structure described above, the third lens of the second lens group has an aspherical surface.

With this structure, since the third lens disposed near the aperture stop is formed with an aspherical surface shape, longitudinal aberrations such as spherical aberration can be effectively corrected.

The present invention provides a zoom lens suited for use in digital cameras and digital video cameras that has a zoom magnification ratio of approximately 3× with a compact design, superior optical properties, and a design that is adequately thin when the lens is retracted.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 (*b*) shows the state of the zoom lens shown in FIG. 1 at the middle position;

FIG. 3 (*c*) shows the state of the zoom lens shown in FIG. 1 at the telephoto end;

FIG. 9 (*b*) shows the state of the zoom lens shown in FIG. 7 at the middle position;

FIG. 9 (*c*) shows the state of the zoom lens shown in FIG. 7 at the telephoto end;

DETAILED DESCRIPTION OF THE EMBODIMENTS

The embodiments of the present invention will be described, with references to the attached figures.

Figure 1:
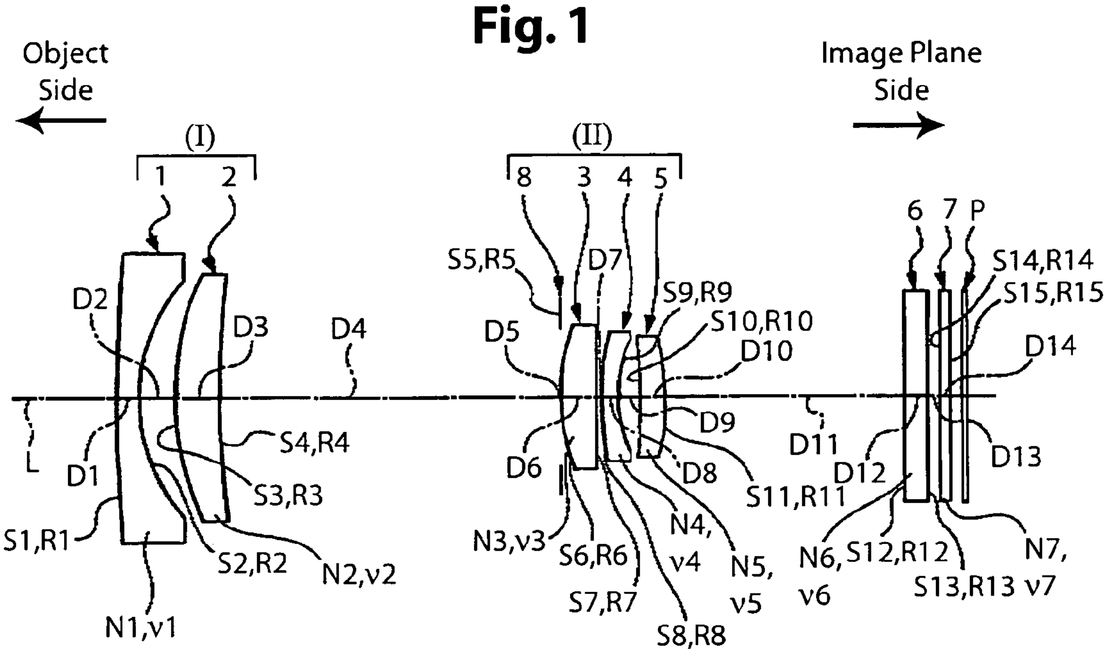
FIG. 1 is a drawing showing the basic structure of an embodiment of a zoom lens according to the present invention.
Figure 2:
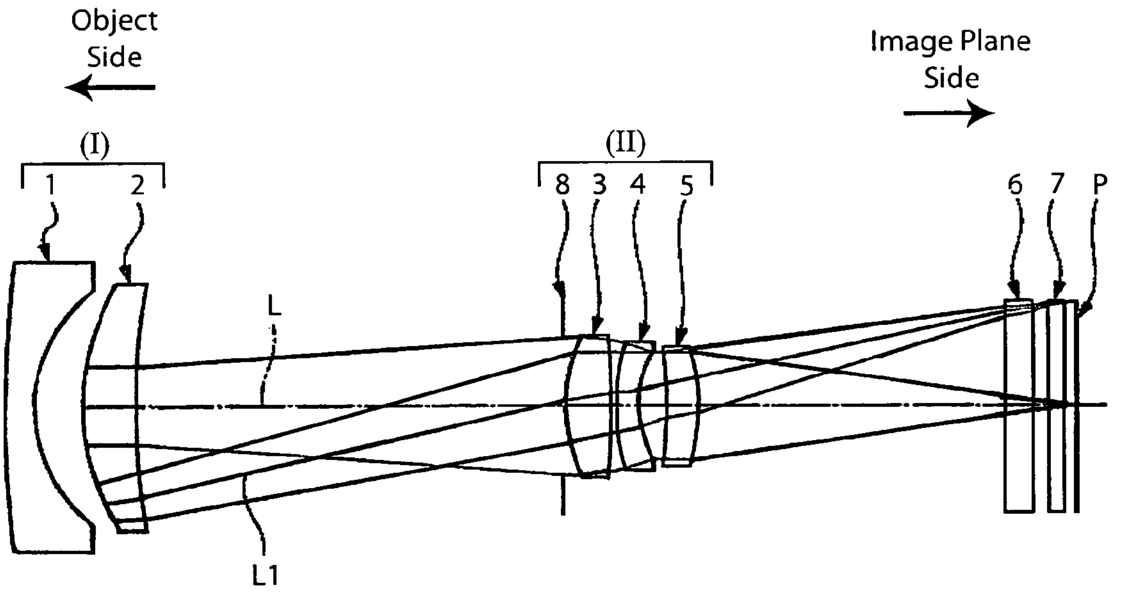
FIG. 2 is an optical ray diagram of the zoom lens shown in FIG. 1.
Figure 3A:
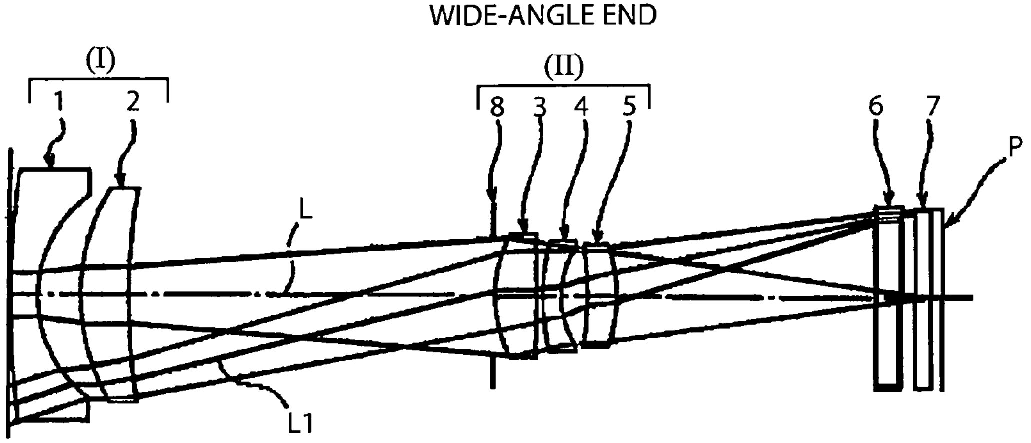
FIG. 3 (*a*) shows the state of the zoom lens shown in FIG. 1. at the wide-angle end.
Figure 3B:
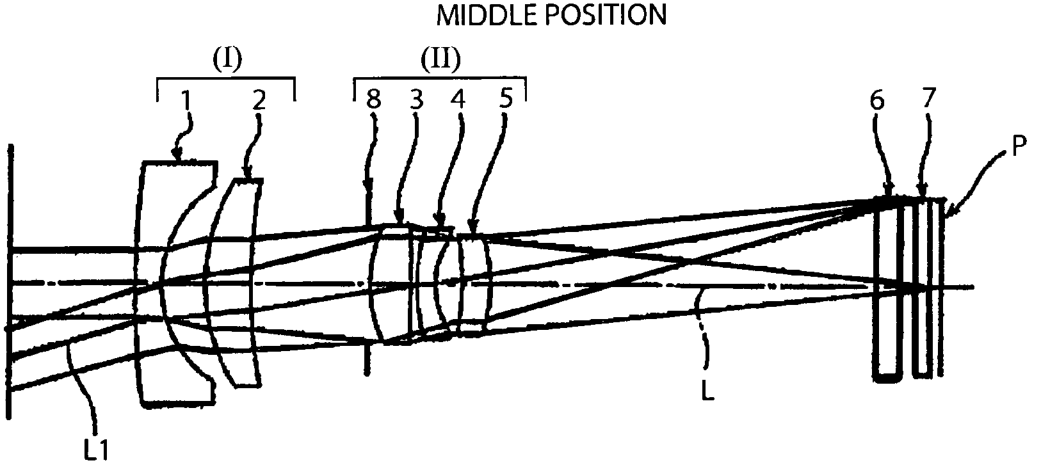
Figure 3C:
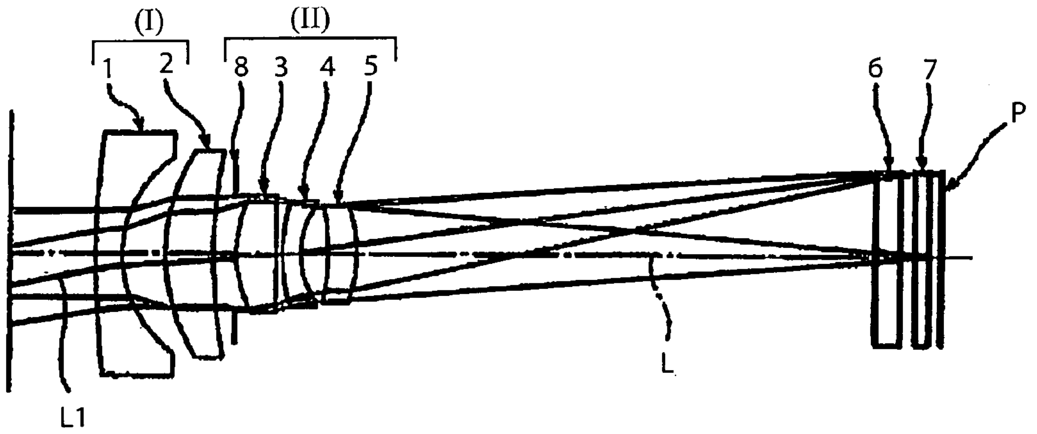

FIG. 1 through FIG. 3 show an embodiment of a zoom lens according to the present invention. FIG. 1 is a drawing showing a basic structure, FIG. 2 is an optical ray diagram, and FIG. 3 shows the state at a wide-angle end, a middle position, and a telephoto end.

As shown in FIG. 1, in this zoom lens, the following are disposed in sequence, going from the object side to the image plane side: a first lens group (I) with negative refractive power; and a second lens group (II) with positive refractive power.

Then, referring to FIG. 3 (*a*), (*b*), (*c*), when zooming from a wide-angle end to a telephoto end, the first lens group (I) is moved toward the image plane side and then reversed and moved toward the object side, while the second lens group (II) is moved monotonically to the object side. More specifically, by changing the relative distances between the lens groups (I) and (II), a zoom magnification of approximately 3× is provided. The correction and focusing for the magnification change is performed by moving the first lens group (I) while the second lens group (II) is moved.

As shown in FIG. 1, the first lens group (I) is formed, going from the object side to the image plane side, from a first lens 1 to the second lens 2. The second lens group (II) is formed, going from the object side to the image plane side, from a third lens 3, a fourth lens 4, and a fifth lens 5. In the second lens group (II), an aperture stop 8 defining a predetermined aperture diameter is disposed in front of (on the object side) the third lens 3.

Glass filters 6, 7, e.g., an infrared cut filter, a low-pass filter, or a cover glass for a CCD, are disposed closer to the image plane side as compared to the fifth lens 5 of the second lens group (II), and behind these is disposed an image plane P of a CCD, or a CMOS imaging element.

The focal length of the first lens group (I) is indicated as fG1 and the focal length of the second lens group (II) is indicated as fG2. The focal length of the lens system at the wide-angle end (from the front surface (S1 of the first lens 1 of the first lens group (I) to the image plane P) is indicated as fw, the thickness of the first lens group (I) along the optical axis is indicated as DG1, and the thickness of the second lens group (II) along the optical axis is indicated as DG2.

As shown in FIG. 1, with the first lens 1 through the fifth lens 5 and the glass filters 6, 7, the surfaces thereof are labeled Si (i=1-15), the radius of curvature of a surface Si is labeled Ri (i=1-15), the refractive index relative to a line d is indicated as Ni, and the Abbe number is indicated as vi (i=1-7).

Furthermore, the distances (thicknesses, air-conversion distance) along an optical axis L from the first lens 1 to the glass filter 7 are indicated as Di (i=1-14), and the distance from the glass filter 7 to the image plane P is indicated as BF. Thus, the thickness DG1 of the first lens group (I) along the optical axis is DG1=D1+D2+D3, and the thickness DG2 of the second lens group (II) along the optical axis is DG2=D6+D7+D8+D9+D10.

In the zoom lens described above, a light ray L1 (object light) issuing from the object passes through the first lens 1 having negative refractive power and is refracted in a convergent manner by the front surface S1 (convex surface) and refracted in a divergent manner by the rear surface S2 (concave surface). When the light ray passes through the second lens 2 having positive refractive power, the light ray is refracted in a convergent manner by the front surface S3 (convex surface) and refracted in a divergent manner by the rear surface S4 (concave surface), with the overall refraction for the first lens group (I) being in the direction of diffraction. When the light ray passes through the third lens 3 having positive refractive power, it is refracted in a convergent manner by the front surface S6 (convex surface) and the rear surface S7 (convex surface). When the light ray passes through the fourth lens 4 having negative refractive power, it is refracted in a convergent manner at the front surface S8 (convex surface) and is refracted in a divergent manner at the rear surface S9 (concave surface). When the light ray passes through the fifth lens 5 having positive refractive power, it is refracted in a divergent manner at the front surface S10 (concave surface) and is refracted in a convergent manner at the rear surface S11 (convex surface). The overall refraction for the second lens group (II) is in the direction of convergence. The light ray then passes through the glass filters 6, 7, and reaches the image plane P of the CCD.

The first lens 1 is a meniscus lens with negative refractive power having the convex surface S1 facing toward the object side and the concave surface S2 facing toward the image plane side.

The second lens 2 is a meniscus lens with positive refractive power having the convex surface S3 facing toward the object side and the concave surface S4 facing toward the image plane side.

The third lens 3 is a biconvex lens with positive refractive power having the convex surface S6 facing toward the object side and the convex surface S7 facing toward the image plane side.

The fourth lens 4 is a meniscus lens with negative refractive power having the convex surface S8 facing toward the object side and the concave surface S9 facing toward the image plane side.

The fifth lens 5 is a meniscus lens with positive refractive power having the concave surface S10 facing toward the object side and the convex surface S11 facing toward the image plane side.

The aperture stop 8 is disposed at the front surface S6 of the third lens 3, which is the lens positioned furthest toward the object in the second lens group (II) and moves in tandem with the second lens group (II). This makes it possible to prevent the exit pupil at the wide-angle end from approaching the image plane P. Also, since the aperture stop 8 moves in tandem with the second lens group (II), the optical path difference from the wide-angle end to the telephoto end can be reduced, making it possible for the second lens group (II) to be compact and thin when in a retracted state.

It can be possible to have the surfaces S1-S4 of the first lens 1 and the second lens 2 and the surfaces S6-S11 of the third lens 3—the fifth lens 5 to be formed as aspherical surfaces. The aspherical surfaces can be formed with diminishing refracting power toward the edge of the lens. This can effectively correct various types of aberrations.

More specifically, by using aspherical surfaces for the object-side surface S1 or the image plane side surface S2 of the first lens 1, which is the lens furthest toward the object side in the first lens group (I), transverse aberrations such as astigmatic aberration and distortion can be effectively corrected. Also, by using an aspherical surface for the object side surface S6 or the image plane side surface S7 of the third lens 3, which is close to the aperture stop 8 of the second lens group (II), longitudinal aberrations such as spherical aberration can be effectively corrected.

The aspherical surfaces are defined by the following equation:

$$Z=Cy^2/[1+(1-\epsilon C^2y^2)^{1/2}]+Dy^4+Ey^6+Fy^8+Gy^{10}+Hy^{12}$$

where Z is the distance from the tangent plane at the vertex of the aspherical surface to a point on the aspherical surface where the height from the optical axis L is y; y is the height from the optical axis; C is the curvature (1/R) at the vertex of the aspherical surface; $\epsilon$ is the conic constant; and D, E, F, G, H are aspherical surface coefficients.

In the structure described above, the following conditions (1), (2) are met:

$$0.90<=(DG1+DG2)/fw<=2.30 \quad (1)$$

$$0.5<=|fG1|/fG2<=1.6 \quad (2)$$

where DG1 is the thickness of the first lens group (I) along the optical axis L; DG2 is the thickness of the second lens group (II) along the optical axis L; fw is the focal length at the wide-angle end of the lens system from the front surface S1 of the first lens 1 to the image plane P; fG1 is the focal length of the first lens group (I); and fG2 is the focal length of the second lens group (II).

The condition (1) defines the relationship between the thicknesses of the first lens group (I) and the second lens group (II) with the focal length at the wide-angle end. The condition (2) defines the relationship between the focal length of the first lens group (I) and the focal length of the second lens group (II). These conditions define a suitable range for setting up the power of each lens group.

If the conditions (1), (2) are not met, providing a thin lens system becomes difficult and providing a zoom magnification ratio of approximately 3× becomes difficult, preventing effective correction of various types of aberrations. Thus, by meeting the conditions (1), (2), the powers of the first lens group (I) and the second lens group (II) can be set up appropriately so that it is possible to provide a zoom lens with superior optical properties that effectively corrects various types of aberration while providing a zoom magnification of approximately 3× and a lens system design that is compact and thin.

In the structure above, it would be preferable for the first lens group (I) to meet the following conditions (3), (4):

$$0.10 <= D2/fw <= 0.35 \quad (3)$$

$$1.5 <= |fG1|/fw <= 2.5 \quad (4)$$

where: D2 is the air distance (distance along the optical axis) between the first lens 1 and the second lens 2; fw is the focal length of the lens system (from the front surface S1 of the first lens 1 to the image plane P) at the wide-angle end; and fG1 is the focal length of the first lens group (I).

The condition (3) defines the relationship between the distance between the lenses and the focal length at the wide-angle end for the first lens group (I). If the condition (3) is not met, the reduction of the total length of the lens system will be inadequate and effectively correcting various types of aberrations, especially coma aberrations, becomes difficult. Thus, by meeting the condition (3), the lens system can be made more compact and thin while superior optical properties can be provided by effectively correcting coma aberration and the like.

The condition (4) defines the relationship between the focal length of the first lens group (I) and the focal length of the lens system at the wide-angle end (i.e., defines the power of the first lens group (I)). If the condition (4) is not met, achieving a desired zoom magnification ratio becomes difficult and effectively correcting various types of aberrations becomes difficult. Thus, by meeting the condition (4), the desired zoom magnification ratio can be reliably provided while superior optical properties can be obtained by effectively correcting various types of aberrations.

In the structure described above, it would be preferable for the second lens group (II) to meet the following condition (5):

$$1.2 <= fG2/fw <= 3.5 \quad (5)$$

where: fG2 is the focal length of the second lens group (II); and fw is the focal length at the wide-angle end of the lens system (from the front surface S1 of the first lens 1 to the image plane P).

The condition (5) defines the relationship between the focal length of the second lens group (II) and the focal length of the lens system at the wide-angle end, i.e., the power of the second lens group (II). If the condition (5) is not met, achieving a desired zoom magnification ratio becomes difficult and effective correction of various types of aberrations becomes difficult. Thus, by meeting the condition (5), a desired zoom magnification ratio can be reliably achieved while superior optical properties can be obtained through effective correction of various types of aberrations.

Next, a first example in which specific numerical values are applied to the zoom lens structure shown in FIG. 1 through FIG. 3 is described below. In the first example, aspherical surfaces are used for the object-side convex surface S1 and the image plane side concave surface S2 of the first lens 1 and the convex surfaces S6, S7 on the object side and the image plane side of the third lens 3.

For the first example, the main specifications are shown in Table 1. Various numerical data (settings) are shown in Table 2. Numerical data relating to the aspherical surfaces are shown in Table 3. Numerical data relating to the focal lengths at the wide-angle end, the middle position, and the telephoto end (wide-angle end fw, middle position fm, telephoto end ft) of the lens system and the distances D4, D11 along the optical axis L are shown in Table 4. In this example, the numerical data for the conditions (1) through (5) are as follows:

$$(DG1+DG2)/fw=1.353 \quad (1)$$

$$|fG1|/fG2=1.255 \quad (2)$$

$$D2/fw=0.234 \quad (3)$$

$$|fG1|/fw=1.976 \quad (4)$$

$$fG2/fw=1.574 \quad (5)$$

In Table 1, the air conversion back focus is the distance from the rear surface S11 of the fifth lens 5 to the image plane P.

Figure 4:
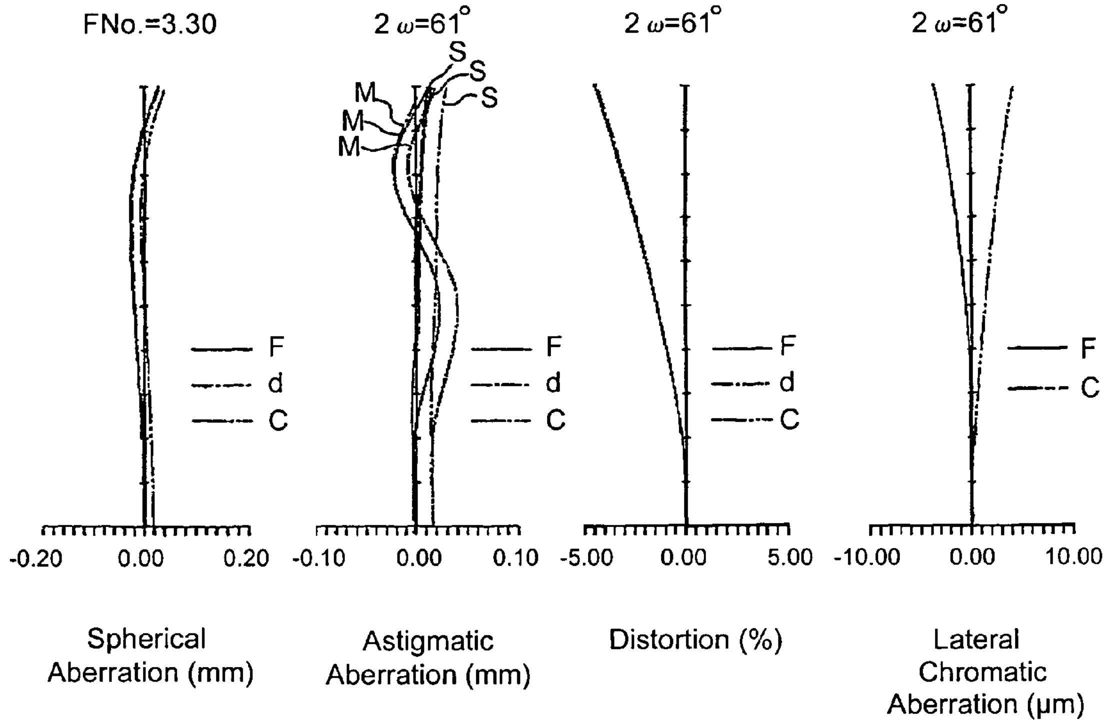
FIG. 4 illustrates aberration charts at the wide-angle end for the zoom lens according to the first example for spherical aberration, astigmatic aberration, distortion, and lateral chromatic aberration.
Figure 5:
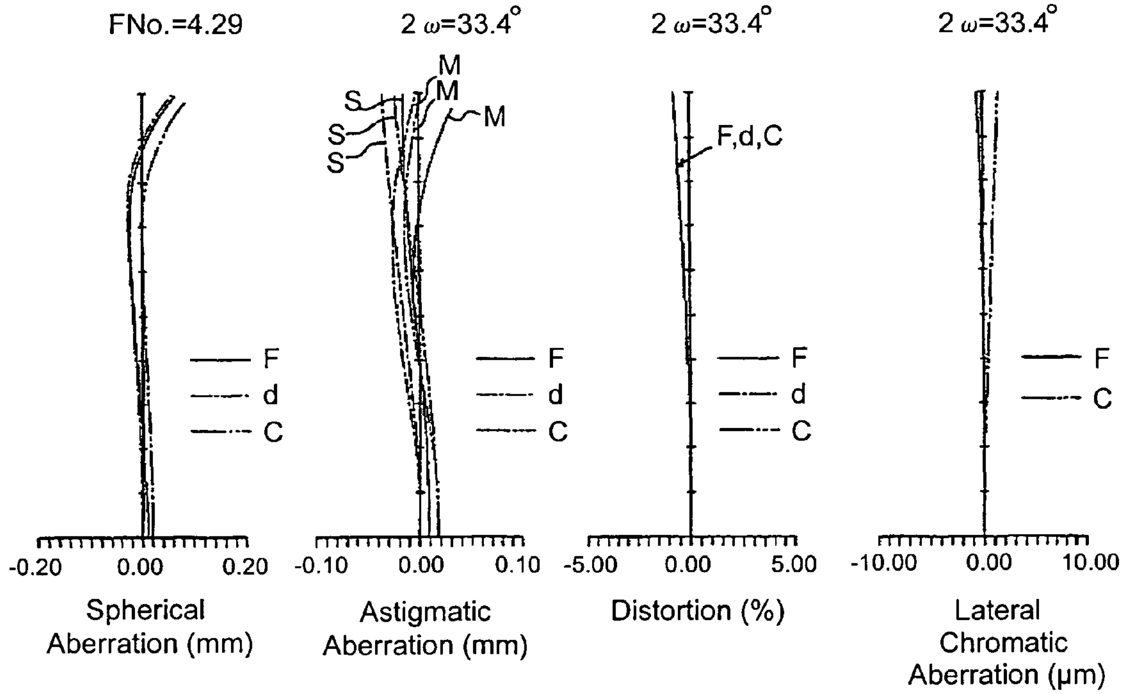
FIG. 5 shows aberration charts at the middle position for the zoom lens according to the first example for spherical aberration, astigmatic aberration, distortion, and lateral chromatic aberration.
Figure 6:
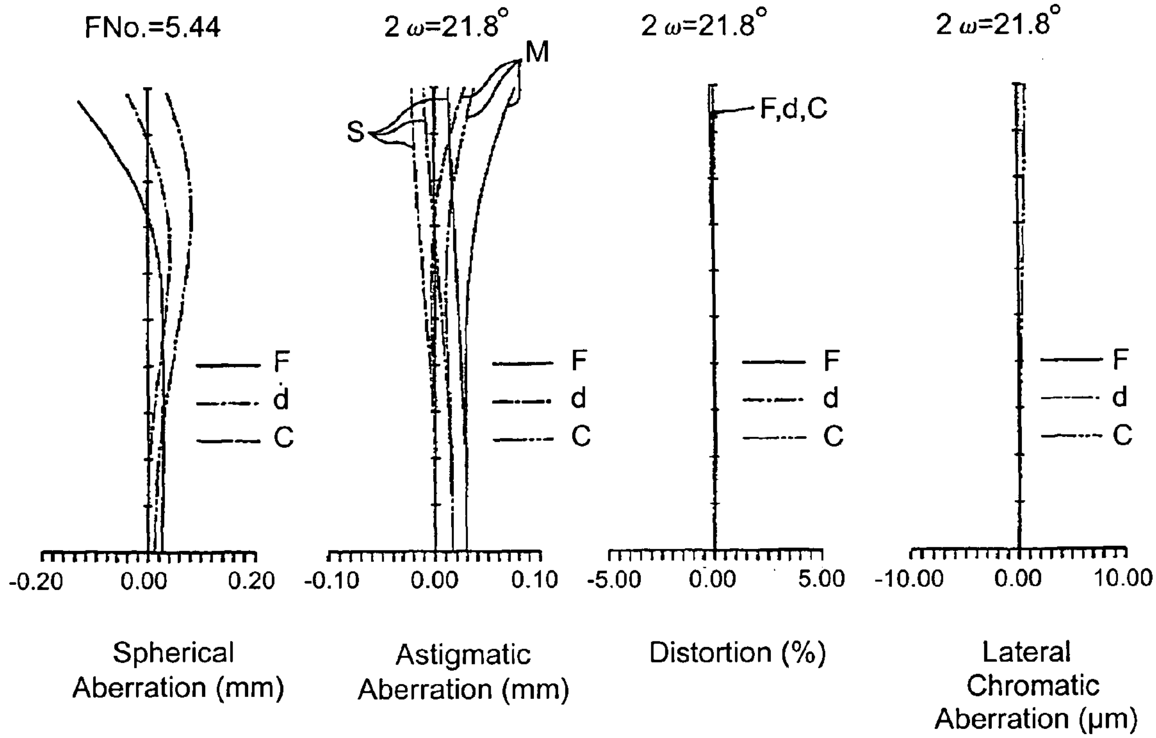
FIG. 6 shows aberration charts at the telephoto end for the zoom lens according to the first example for spherical aberration, astigmatic aberration, distortion, and lateral chromatic aberration.

Also, FIG. 4, FIG. 5, and FIG. 6 show aberration charts relating to spherical aberration, astigmatic aberration, distortion, and lateral chromatic aberration at the wide-angle end, the middle position, and the telephoto end. In FIG. 4 through FIG. 6, d is aberration from the d line, F is the aberration from the F line, C is the aberration from the C line, S is the aberration at the saggital plane, and M is the aberration at the meridional plane.

TABLE 1

| | Wide-angle end (W) | Middle position (M) | Telephoto end (T) |
|---|---|---|---|
| Object distance (mm) | | Infinity (∞) | |
| Focal length (mm) | 6.41 | 12.13 | 18.78 |
| Zoom magnification | | 2.93 | |
| F number | 3.30 | 4.29 | 5.44 |
| Angle of view(2ω) | 61.0° | 33.4° | 21.8° |
| Exit pupil position (mm) | −15.22 | −19.77 | −25.07 |
| Exit angle of outermost light ray (deg) (Angle of light ray for 3.60 mm image height) | 12.6 | 11.0 | 8.6 |
| Total lens length (from the front surface of the first lens to the rear surface of the fifth lens) (mm) | 22.75 | 13.35 | 9.62 |
| Total lens system length (from the front surface of the first lens to the image plane, air conversion) (mm) | 34.39 | 29.55 | 31.14 |
| Back focus (air conversion) | 11.64 | 16.20 | 21.52 |

TABLE 2

| | | | | | | |
|---|---|---|---|---|---|---|
| S1* | R1 | 46.013 | D1 | 1.00 | N1 | ν1 |
| S2* | R2 | 4.445 | | | 1.804698 | 40.9 |
| | | | D2 | 1.50 | | |
| S3 | R3 | 7.351 | D3 | 1.72 | N2 | ν2 |
| S4 | R4 | 19.266 | | | 1.805180 | 25.4 |
| | | | D4 | Variable | | |
| S5 | R5 | ∞ (Aperture stop) | | | | |
| | | | D5 | 0.00 | | |
| S6* | R6 | 4.344 | D6 | 1.55 | N3 | ν3 |
| S7* | R7 | −61.023 | | | 1.583325 | 59.1 |
| | | | D7 | 0.20 | | |

TABLE 2-continued

| | | | | | | |
|---|---|---|---|---|---|---|
| S8 | R8 | 7.201 | D8 | 0.70 | N4 | ν4 |
| S9 | R9 | 3.730 | | | 1.808090 | 22.8 |
| | | | D9 | 0.90 | | |
| S10 | R10 | −10.173 | D10 | 1.10 | N5 | ν5 |
| S11 | R11 | −5.557 | | | 1.487490 | 70.2 |
| | | | D11 | Variable | | |
| S12 | R12 | ∞ | D12 | 0.90 | N6 | ν6 |
| S13 | R13 | ∞ | | | 1.516798 | 64.2 |
| | | | D13 | 0.50 | | |
| S14 | R14 | ∞ | D14 | 0.50 | N7 | ν7 |
| S15 | R15 | ∞ | | | 1.516798 | 64.2 |

*Aspherical surface

TABLE 3

| | Aspherical surface coefficient | Numerical data |
|---|---|---|
| S1 surface | ε | −13.26414 |
| | D | $-1.970370 \times 10^{-5}$ |
| | E | $1.899009 \times 10^{-6}$ |
| | F | $-1.391879 \times 10^{-7}$ |
| | G | $4.352525 \times 10^{-9}$ |
| | H | $-5.049559 \times 10^{-11}$ |
| S2 surface | ε | 0.805562 |
| | D | $-5.566245 \times 10^{-4}$ |
| | E | $2.303567 \times 10^{-5}$ |
| | F | $-4.145291 \times 10^{-6}$ |
| | G | $2.373057 \times 10^{-7}$ |
| | H | $-7.665963 \times 10^{-9}$ |
| S6 surface | ε | −1.663038 |
| | D | $3.246213 \times 10^{-3}$ |
| | E | $-9.536197 \times 10^{-5}$ |
| | F | $5.827330 \times 10^{-6}$ |
| | G | $-6.420735 \times 10^{-7}$ |
| | H | 0.000000 |
| S7 surface | ε | 1.000000 |
| | D | $1.020291 \times 10^{-3}$ |
| | E | $-5.272271 \times 10^{-6}$ |
| | F | $-3.050482 \times 10^{-6}$ |
| | G | $-3.044280 \times 10^{-7}$ |
| | H | 0.000000 |

TABLE 4

| | Wide-angle end (W) | Middle position (M) | Telephoto end (T) |
|---|---|---|---|
| Focal length | fw | fm | ft |
| (mm) | 6.41 | 12.13 | 18.78 |
| D4 (mm) | 14.08 | 4.68 | 0.95 |
| D11 (mm) | 9.72 | 14.28 | 19.60 |

In the embodiment described above, at the wide-angle end, the middle position, and the telephoto end positions, the total lens length (from the first lens 1 to the fifth lens 5) is 22.75 mm-13.35 mm-9.62 mm; the total length of the lens system (air conversion distance from the first lens 1 to the image plane P) is 34.39 mm-29.55 mm-31.14 mm; the zoom magnification ratio is 2.93 (fixed); the F number is 3.30-4.29-5.44; the angle of view (2ω) is 61.0 deg-33.4 deg-21.8 deg. Thus, a zoom magnification ratio of approximately 3× is obtained while a compact and thin zoom lens with superior optical properties is provided.

Figure 7:
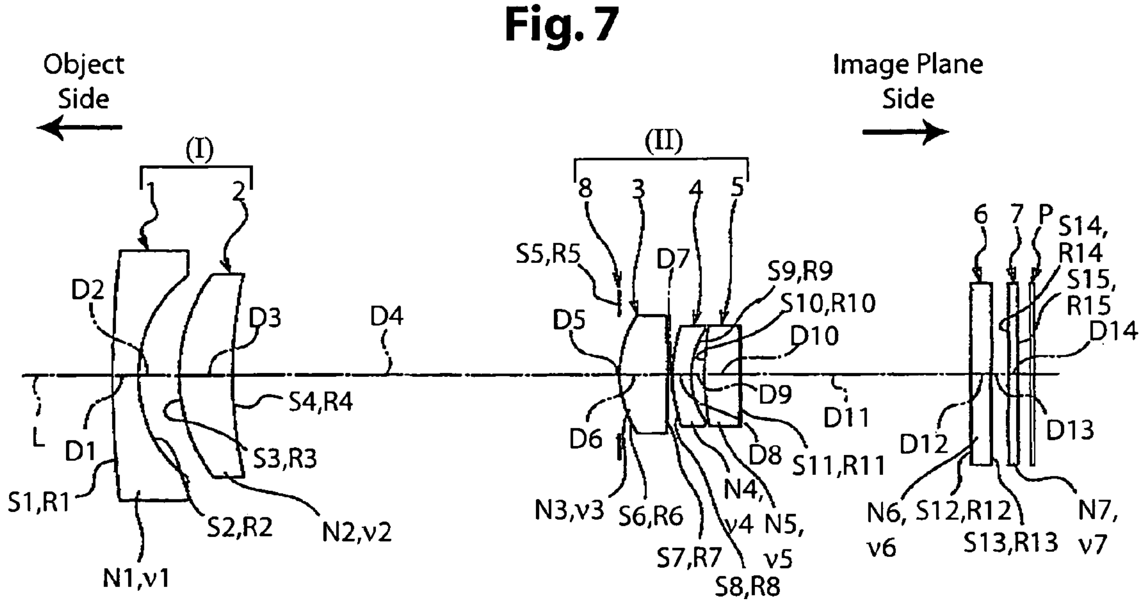
FIG. 7 illustrates the basic structure of another embodiment of a zoom lens according to the present invention.
Figure 8:
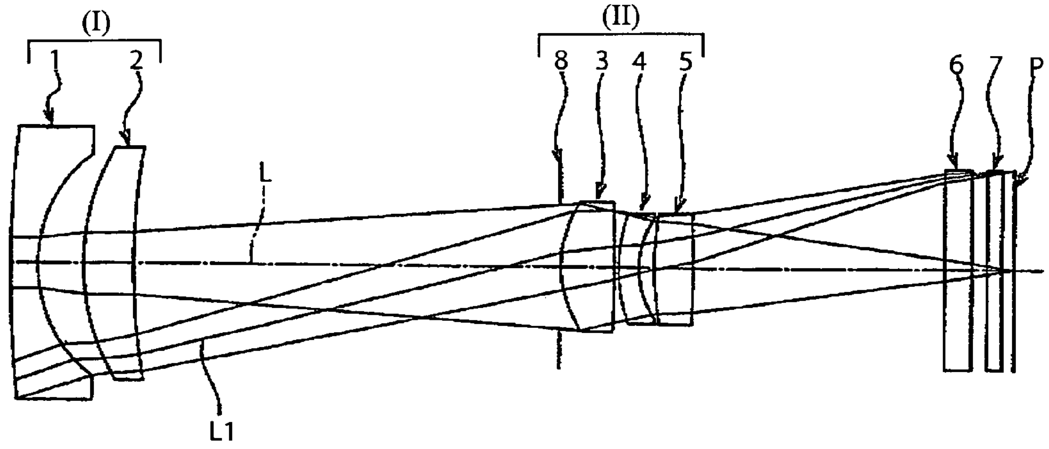
FIG. 8 is an optical ray diagram of the zoom lens shown in FIG. 7.
Figure 9A:
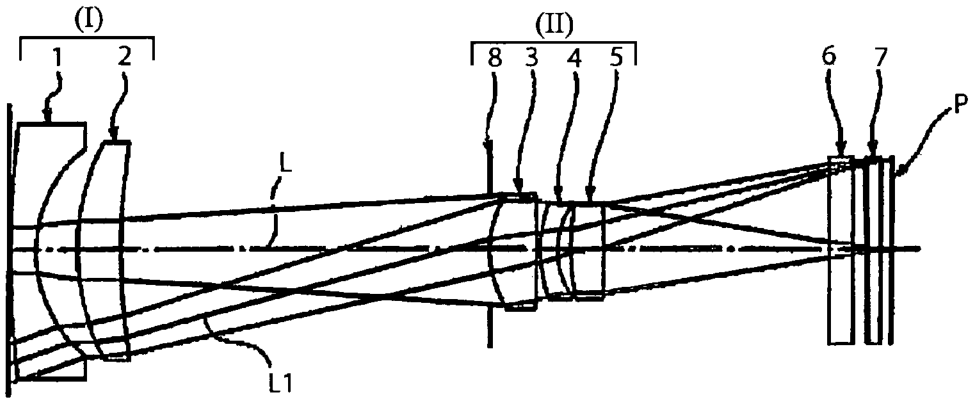
FIG. 9 (*a*) shows the state of the zoom lens shown in FIG. 7. at the wide-angle end.
Figure 9B:
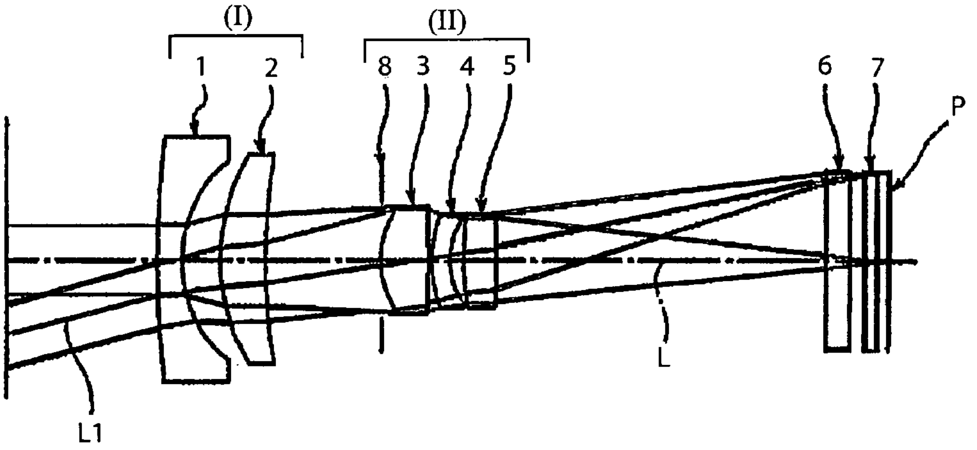
Figure 9C:
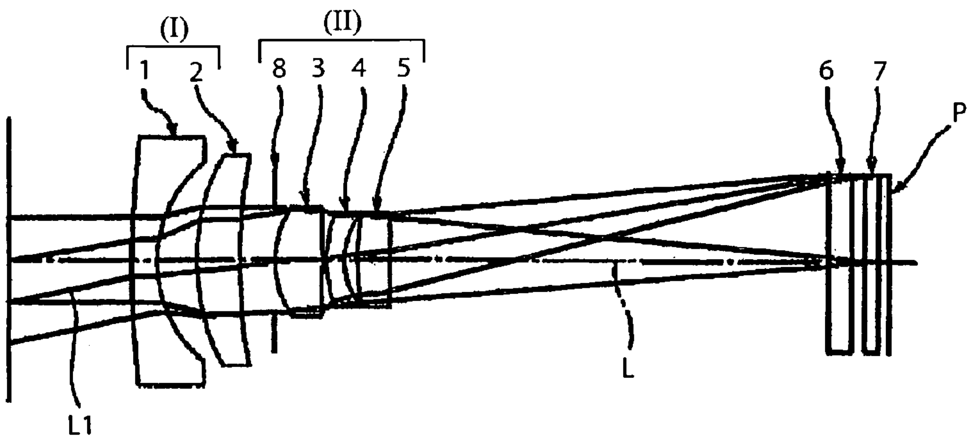

FIG. 7 through FIG. 9 shows another example of a zoom lens according to the present invention. FIG. 7 is a drawing showing the basic structure. FIG. 8 is an optical ray diagram. FIG. 9 shows states at the wide-angle end, the middle position, and the telephoto end.

In this example, a fifth lens 5' is a biconvex lens formed from convex surfaces S10, S11 on the object side and the image plane side. Aspherical surfaces are only used on the concave surface S2 on the image plane side of the first lens 1 and the convex surface S6 on the object side of the third lens 3. Otherwise, the structures are identical to those of the example described above.

An example in which specific numerical values are applied to this zoom lens structure will be described below as a second example.

For the second example, the main specifications are shown in Table 5. Various numerical data (settings) are shown in Table 6. Numerical data relating to the aspherical surfaces are shown in Table 7. Numerical data relating to the focal lengths at the wide-angle end, the middle position, and the telephoto end (wide-angle end fw, middle position fm, telephoto end ft) of the lens system and the distances D4, D11 along the optical axis L are shown in Table 8. In this example, the numerical data for the conditions (1) through (5) are as follows:

$$(DG1+DG2)/fw=1.438 \quad (1)$$

$$|fG1|/fG2=0.770 \quad (2)$$

$$D2/fw=0.245 \quad (3)$$

$$|fG1|/fw=2.103 \quad (4)$$

$$fG2/fw=2.729 \quad (5)$$

In Table 5, the air conversion back focus is the distance from the rear surface S11 of the fifth lens 5' to the image plane P.

Figure 10:
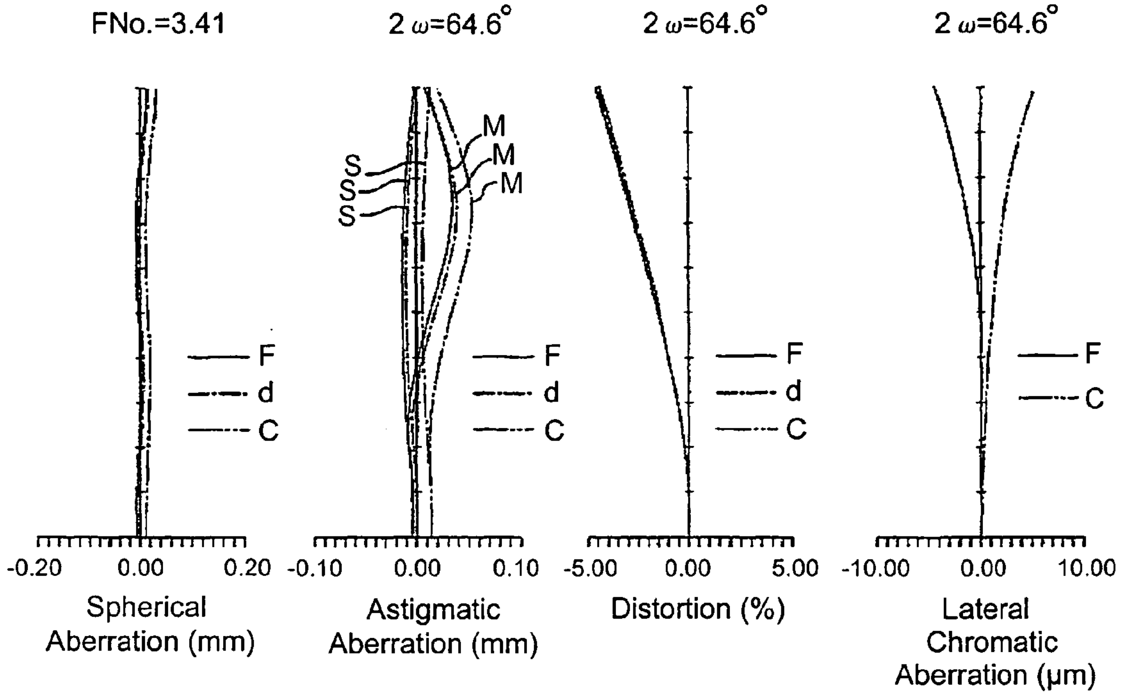
FIG. 10 shows aberration charts at the wide-angle end for the zoom lens according to the second example for spherical aberration, astigmatic aberration, distortion, and lateral chromatic aberration.
Figure 11:
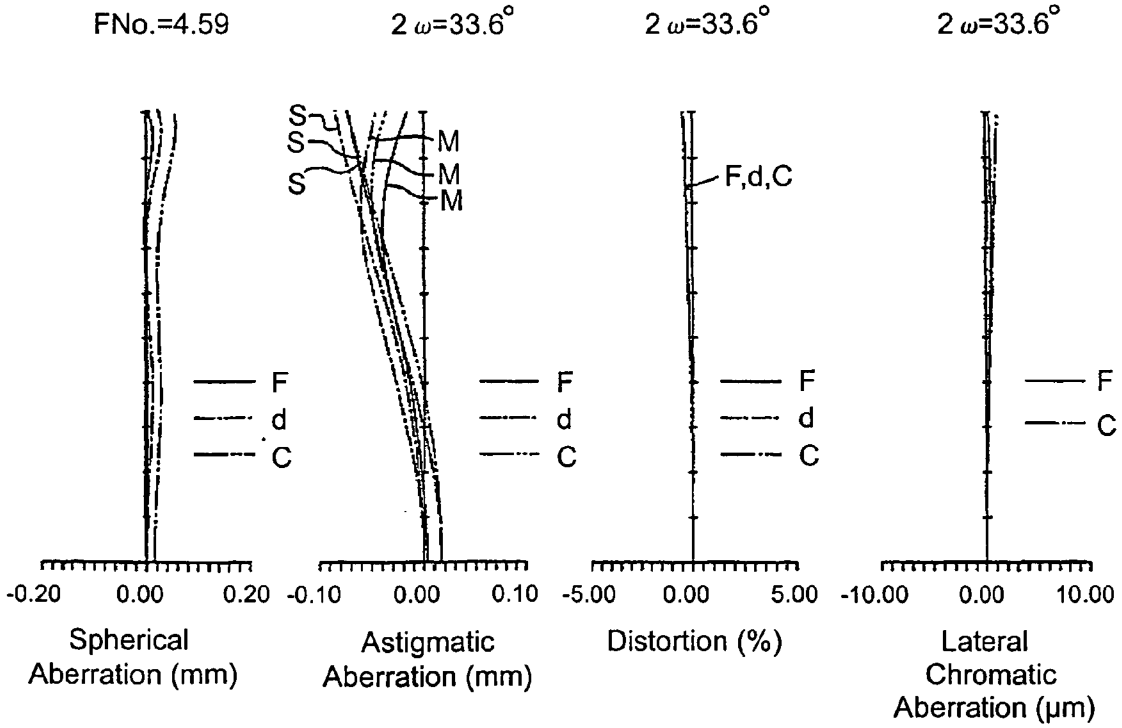
FIG. 11 shows aberration charts at the middle position for the zoom lens according to the second example for spherical aberration, astigmatic aberration, distortion, and lateral chromatic aberration.
Figure 12:
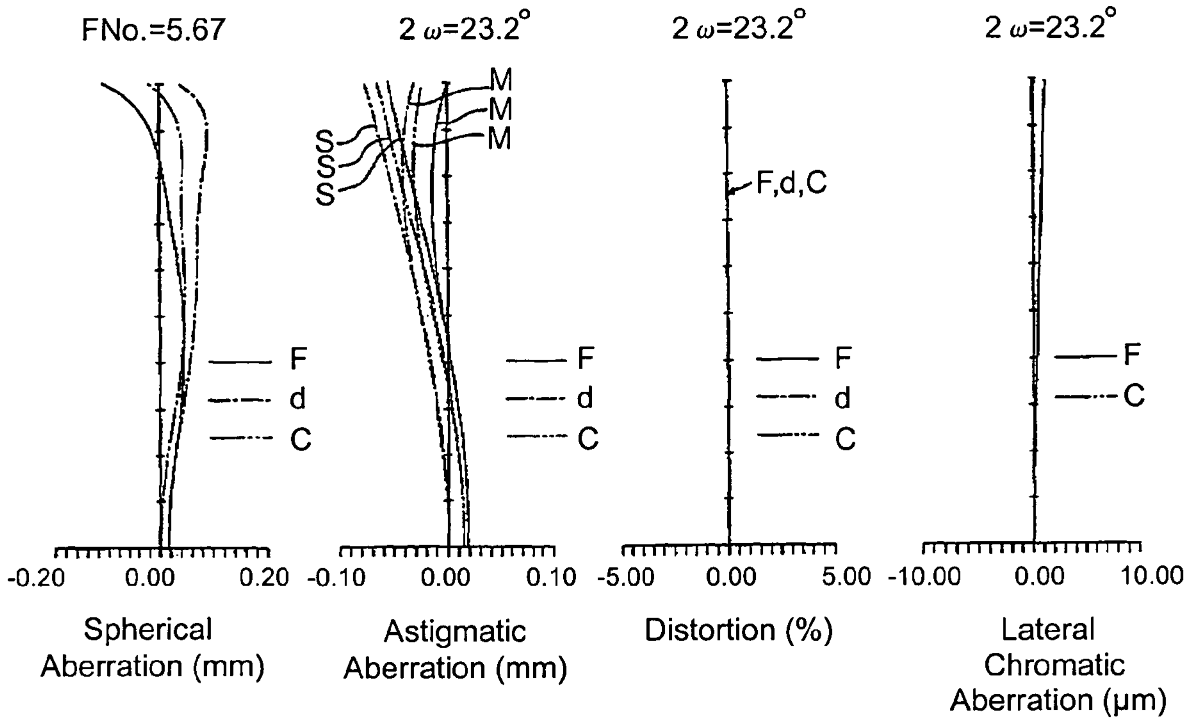
FIG. 12 shows aberration charts at the telephoto end for the zoom lens according to the second example for spherical aberration, astigmatic aberration, distortion, and lateral chromatic aberration.

Also, FIG. 10, FIG. 11, and FIG. 12 show aberration charts relating to spherical aberration, astigmatic aberration, distortion, and lateral chromatic aberration at the wide-angle end, the middle position, and the telephoto end. In FIG. 10 through FIG. 12, d is aberration from the d line, F is the aberration from the F line, C is the aberration from the C line, S is the aberration at the saggital plane, and M is the aberration at the meridional plane.

TABLE 5

| | Wide-angle end (W) | Middle position (M) | Telephoto end (T) |
|---|---|---|---|
| Object distance | | Infinity (∞) | |
| Focal length | 6.33 | 12.62 | 18.45 |
| Zoom magnification | | 2.91 | |
| F number | 3.41 | 4.59 | 5.67 |
| Angle of view (2ω) | 64.6° | 33.6° | 23.2° |
| Exit pupil position (mm) | −13.52 | −18.18 | −22.50 |
| Exit angle of outermost light ray (deg) (Angle of light ray for 3.60 mm image height) | 13.2 | 11.6 | 9.4 |
| Total lens length (from the front surface of the first lens to the rear surface of the fifth lens) (mm) | 23.95 | 13.64 | 10.37 |
| Total lens system length (from the front surface of the first lens to the image plane, air conversion) (mm) | 34.57 | 28.91 | 29.96 |
| Back focus (air conversion) | 10.62 | 15.27 | 19.60 |

TABLE 6

| Surface | | Radius of curvature (mm) | Distance (mm) | | Refractive index (d line) | Abbe number |
|---|---|---|---|---|---|---|
| S1 | R1 | 51.313 | D1 | 1.00 | N1 | ν1 |
| S2* | R2 | 4.693 | | | 1.804698 | 40.9 |
| | | | D2 | 1.55 | | |
| S3 | R3 | 7.686 | D3 | 1.97 | N2 | ν2 |
| S4 | R4 | 20.364 | | | 1.805180 | 25.4 |
| | | | D4 | Variable | | |
| S5 | R5 | ∞ (Aperture stop) | | | | |
| | | | D5 | 0.00 | | |
| S6* | R6 | 3.669 | D6 | 1.89 | N3 | ν3 |
| S7 | R7 | −160.106 | | | 1.518348 | 70.3 |
| | | | D7 | 0.22 | | |
| S8 | R8 | 6.714 | D8 | 0.65 | N4 | ν4 |
| S9 | R9 | 3.366 | | | 2.003300 | 28.3 |
| | | | D9 | 0.50 | | |
| S10 | R10 | 10.216 | D10 | 1.32 | N5 | ν5 |
| S11 | R11 | −185.082 | | | 1.717000 | 47.9 |
| | | | D11 | Variable | | |
| S12 | R12 | ∞ | D12 | 0.90 | N6 | ν6 |
| S13 | R13 | ∞ | | | 1.516798 | 64.2 |
| | | | D13 | 0.50 | | |
| S14 | R14 | ∞ | D14 | 0.50 | N7 | ν7 |
| S15 | R15 | ∞ | | | 1.516798 | 64.2 |

*Aspherical surface

TABLE 7

| Aspherical surface coefficient | | Numerical data |
|---|---|---|
| S2 surface | ε | 0.156012 |
| | D | $3.768980 \times 10^{-4}$ |
| | E | $8.469010 \times 10^{-6}$ |
| | F | $-3.355900 \times 10^{-7}$ |
| | G | $6.735880 \times 10^{-9}$ |
| | H | 0.000000 |
| S6 surface | ε | 0.584607 |
| | D | $-5.594890 \times 10^{-4}$ |
| | E | $1.014125 \times 10^{-5}$ |
| | F | $-7.330560 \times 10^{-6}$ |
| | G | $4.811800 \times 10^{-7}$ |
| | H | 0.000000 |

TABLE 8

| | Wide-angle end (W) | Middle position (M) | Telephoto end (T) |
|---|---|---|---|
| Focal length | fw | fm | ft |
| (mm) | 6.33 | 12.62 | 18.45 |
| D4 (mm) | 14.85 | 4.54 | 1.27 |
| D11 (mm) | 8.70 | 13.35 | 17.68 |

In the example described above, at the wide-angle end, the middle position, and the telephoto end positions, the total lens length (from the first lens 1 to the fifth lens 5) is 23.95 mm-13.64 mm-10.37 mm; the total length of the lens system (air conversion distance from the first lens 1 to the image plane P) is 34.57 mm-28.91 mm-29.96 mm; the zoom magnification ratio is 2.91 (fixed); the F number is 3.41-4.59-5.67; the angle of view (2ω) is 64.6 deg-33.6 deg-23.2 deg. Thus, a zoom magnification ratio of approximately 3× is obtained while a compact and thin zoom lens with superior optical properties is provided.

A zoom lens according to the present invention as described above provides a design that is compact, thin, light-weight, and low-cost. Thus, the present invention is suitable for digital still cameras, digital video cameras, and the like, where there is a demand for compactness, and can also be used for other lens optical systems that perform imaging with zooming.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A zoom lens comprising, going from an object side to an image plane side:

a first lens group located on said object side of said zoom lens, said first lens group having an overall negative refractive power and further comprising, going from said object side to said image plane side:

a meniscus-shaped first lens having negative refractive power with a convex surface facing toward said object side; and a meniscus-shaped second lens having positive refractive power with a convex surface facing toward said object side and conditions (1), (2) are met:

$$0.10 <= D2/fw <= 0.35 \quad (1)$$

$$1.5 >= |fG1|/fw <= 2.5 \quad (2)$$

where

D2: air distance between said first lens and said second lens: and a second lens group located on said image plane side of said zoom lens, said second lens group having an overall positive refractive power;

wherein said zoom lens includes only said first lens group and said second lens group between said object side and said image plane side of said zoom lens, and wherein zoom magnification is changed from a wide-angle end to a telephoto end by moving said first lens group toward said image plane side and then reversing to said object side, while moving said second lens group to said object side, said zoom lens meeting conditions (3), (4):

$$0.90 <= (DG1+DG2)/fw <= 2.30 \quad (3)$$

$$0.5 <= |fG1|/fG2 <= 1.6 \quad (4)$$

where

DG1: thickness of said first lens group along said optical axis;

DG2: thickness of said second lens group along said optical axis;

fw: focal length of said lens system at said wide-angle end from said first lens group to said image plane;

fG1: focal length of said first lens group; and fG2: focal length of said second lens group.

2. A zoom lens according to claim 1 wherein said second lens group comprises, going from said object side to said image plane side:

a third lens with positive refractive power;

a fourth lens with negative refractive power, and a fifth lens with positive refractive power, wherein said second lens group meets a condition (5):

$$1.2 <= fG2/fw <= 3.5. \quad (5)$$

3. A zoom lens according to claim 2 wherein said third lens of said second lens group includes an aspherical surface.

4. A zoom lens according to claim 2 further comprising an aperture stop disposed to move in tandem with said second lens group; and said aperture stop is disposed at a position furthest toward said object side of said second lens group.

5. A zoom lens according to claim 2 wherein:

said first lens group and said second lens group include lenses with aspherical surfaces; and the aspherical surfaces are formed so that refractive power is lower toward a perimeter of said lens.

6. A zoom lens according to claim 2 wherein said first lens of said first lens group includes an aspherical surface.

7. A zoom lens according to claim 1 further comprising an aperture stop disposed to move in tandem with said second lens group; and said aperture stop is disposed at a position furthest toward said object side of said second lens group.

8. A zoom lens according to claim 7 wherein:

said first lens group and said second lens group include lenses with aspherical surfaces; and said aspherical surfaces are formed so that refractive power is lower toward a perimeter of said lens.

9. A zoom lens according to claim 7 wherein said first lens of said first lens group includes an aspherical surface.

10. A zoom lens according to claim 7 wherein said third lens of said second lens group includes an aspherical surface.

11. A zoom lens according to claim 1 wherein:

said first lens group and said second lens group include lenses with aspherical surfaces; and said aspherical surfaces are formed so that refractive power is lower toward a perimeter of said lens.

12. A zoom lens according to claim 11 wherein said first lens of said first lens group includes an aspherical surface.

13. A zoom lens according to claim 11 wherein said third lens of said second lens group includes an aspherical surface.

14. A zoom lens according to claim 1 wherein said first lens of said first lens group includes an aspherical surface.

15. A zoom lens according to claim 14 wherein said third lens of said second lens group includes an aspherical surface.

16. A zoom lens according to claim 1 wherein:

said first lens group and said second lens group include lenses with aspherical surfaces; and said aspherical surfaces are formed so that refractive power is lower toward a perimeter of said lens.

* * * * *